United States Patent
Parmar et al.

(10) Patent No.: US 9,819,265 B1
(45) Date of Patent: Nov. 14, 2017

(54) MULTIPHASE POWER CONTROLLER WITH DYNAMIC PHASE MANAGEMENT

(71) Applicant: Texas Instruments Incorporated, Dallas, TX (US)

(72) Inventors: Manish Parmar, Bangalore (IN); Preetam Charan Anand Tadeparthy, Bangalore (IN); Dattatreya Baragur Suryanarayana, Cary, NC (US); Naga Venkata Prasadu Mangina, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/265,628

(22) Filed: Sep. 14, 2016

(51) Int. Cl.
*H02M 3/158* (2006.01)
*H02M 3/157* (2006.01)
*H02M 1/08* (2006.01)
*H02M 1/00* (2006.01)

(52) U.S. Cl.
CPC ............ *H02M 3/157* (2013.01); *H02M 1/08* (2013.01); *H02M 2001/0012* (2013.01)

(58) Field of Classification Search
CPC .......... H02M 2001/0012; H02M 1/08; H02M 3/156; H02M 3/157; H02M 3/158; H02M 3/1584; H02M 2003/1586; H02M 3/1588
USPC ................ 323/271, 272, 282, 283, 284, 285
See application file for complete search history.

(56) References Cited

U.S. PATENT DOCUMENTS

| | | | | |
|---|---|---|---|---|
| 8,710,810 B1* | 4/2014 | McJimsey | ........... | H02M 3/1584 323/272 |
| 2004/0150928 A1* | 8/2004 | Goodfellow | ........ | H02M 3/1584 361/90 |
| 2007/0013350 A1* | 1/2007 | Tang | .................... | H02M 3/1584 323/237 |
| 2012/0262136 A1* | 10/2012 | Nien | .................... | H02M 3/1584 323/272 |
| 2013/0027009 A1* | 1/2013 | Tang | .................... | H02M 3/1584 323/271 |
| 2013/0057240 A1* | 3/2013 | Zambetti | ............. | H02M 3/1584 323/271 |
| 2015/0288285 A1* | 10/2015 | Paul | .................... | H02M 3/1584 323/271 |
| 2016/0299520 A1* | 10/2016 | Mangina | ................. | G05F 1/575 |
| 2017/0060154 A1* | 3/2017 | Ozawa | .................... | G05F 1/575 |

* cited by examiner

*Primary Examiner* — Jeffrey Sterrett
(74) *Attorney, Agent, or Firm* — Jacqueline J. Garner; Charles A. Brill; Frank D. Cimino

(57) ABSTRACT

A multiphase power controller that generates a set of switching control signals to drive a set of power stages. The set of power stages generates an output that drives a load. The multiphase power controller includes a summer to generate an equivalent voltage representative of a sum of inductor currents from each of an inductor in the set of power stages. A threshold generation circuit generates a set of threshold signals in response to a set of control outputs and a reference. A set of comparators generates the set of control outputs, in response to the equivalent voltage and the set of threshold signals. A state machine generates a set of phase control signals in response to the set of control outputs. The set of control outputs changes a number of the set of switching control signals.

19 Claims, 5 Drawing Sheets

MULTIPHASE POWER CONTROLLER WITH DYNAMIC PHASE MANAGEMENT

TECHNICAL FIELD

The present disclosure relates to multiphase power controllers in integrated circuits.

BACKGROUND

In multiphase power supply systems, a load is divided into several regions. A multiphase power controller in such systems is divided into a number of phases that are assigned to a corresponding number of regions of the load. Normally there is a one to one mapping between the number of phases and the regions of the load.

The multiphase power controller generates multiple PWM (pulse width modulation) outputs that drive multiple power stages. The multiphase power controller operates by sharing equal currents among all the phases. A power stage includes an inductor and a switching circuitry having a driver. Therefore, the current passing through the inductor in the power stages is shared equally, then added and delivered to the load. An 'n' phase power controller provides 'n' PWM outputs to 'n' power stages. The PWM outputs are generated from the controller in response to the inductor currents and output voltage of the power stages in a closed loop.

In multiphase controllers, the load current is shared among the multiple phases even when the load current is low. Multiple power stages and other internal circuits continue to switch in such low load currents generating multiple PWM outputs. In other words, the PWM outputs are active for a 0 load current to a MAX load current. The PWM outputs being active at lower load conditions contributes to power consumption, conduction losses and switching losses affecting the efficiency of the multiphase power supply system.

SUMMARY

One aspect provides a multiphase power system. The multiphase power system includes a multiphase power controller that generates a set of switching control signals to drive a set of power stages. The set of power stages generates an output that drives a load. The multiphase power controller includes a summer to generate an equivalent voltage representative of a sum of inductor currents from each of an inductor in the set of power stages. A threshold generation circuit generates a set of threshold signals in response to a set of control outputs and a reference. A set of comparators generates the set of control outputs, in response to the equivalent voltage and the set of threshold signals. A state machine generates a set of phase control signals in response to the set of control outputs. The set of control outputs changes a number of the set of switching control signals.

Another aspect provides a multiphase power controller. The multiphase power controller includes a phase manage block that generates a set of phase control signals in response to an equivalent voltage and a threshold voltage. The multiphase power controller also includes a control loop that generates a set of switching control signals in response to the set of phase control signals. The set of switching control signals drive a set of power stages. The set of power stages generates an output that drives a load. The output is fed back to the control loop.

Another aspect provides an apparatus having a processor and a multiphase power controller coupled to the processor. The multiphase power controller generates a set of switching control signals that drive a set of power stages. The set of power stages generates an output that drives a load. The multiphase power controller includes a summer to generate an equivalent voltage representative of a sum of inductor currents from each of an inductor in the set of power stages. A threshold generation circuit generates a set of threshold signals in response to a set of control outputs and a reference. A set of comparators to generates the set of control outputs, in response to the equivalent voltage and the set of threshold signals. A state machine generates a set of phase control signals in response to the set of control outputs. The set of control outputs changes a number of the switching control signals.

Another aspect provides a multiphase power system. The system has a multiphase power controller having an inductor current input lead and a switching control output lead. The switching control output lead is coupled to a set of power stages. The multiphase power controller includes a summer having a first input coupled to the inductor current input lead and an output coupled to a first input of a set of comparators. A threshold generation circuit has an input and an output, the output connected to a second input of the set of comparators. A state machine has an input connected to outputs of the set of comparators. A control loop has a first input connected to a set of outputs of the state machine. The control loop has a set of first outputs connected to the switching control output lead. The control loop further has a second output coupled to a second input of the summer and the input of the threshold generation circuit. The set of power stages has an output coupled to a voltage output terminal. A second input of the control loop is coupled to the voltage output terminal. A load having an input is connected to the voltage output terminal.

Other aspects and example embodiments are provided in the Drawings and the Detailed Description that follows.

BRIEF DESCRIPTION OF THE VIEWS OF DRAWINGS

DETAILED DESCRIPTION OF THE EMBODIMENTS

In various embodiments, a multiphase power controller monitors the phase currents in the system. The information about the phase currents is available in the multiphase power controller. Several embodiments introduce a scheme where the phase currents of each inductor in power stages are determined. Based on a threshold, which is predetermined, each phase is activated or inactivated per a load current requirement. Various embodiments of the disclosure calculate an optimum number of phases without sacrificing load and line regulation and yet maximize the efficiency for entire range of load currents.

Figure 1:
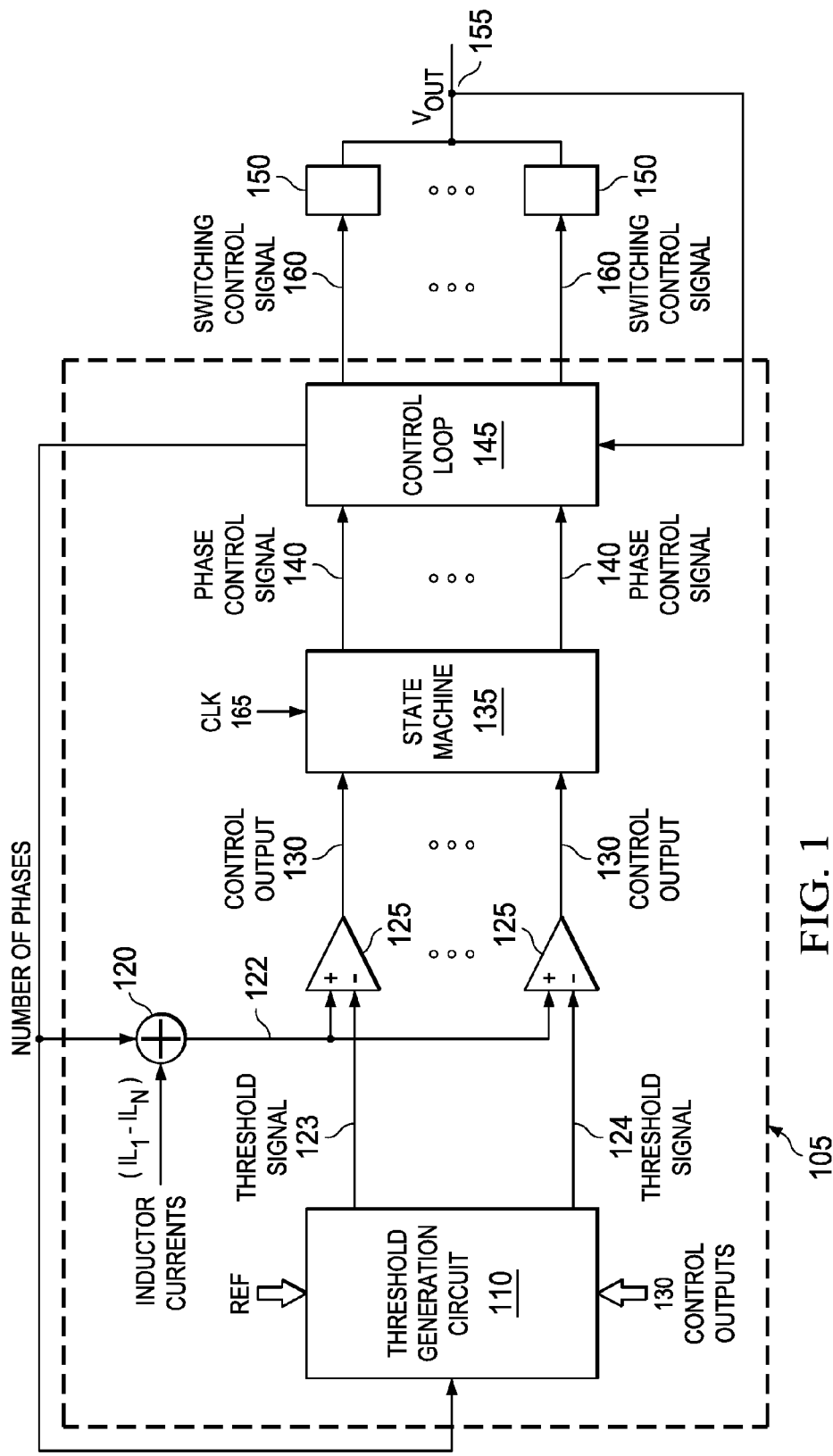
FIG. 1 depicts a schematic of a multiphase power system according to an embodiment.

FIG. 1 depicts a schematic of a multiphase power system according to an embodiment. The multiphase power system has a multiphase power controller 105 that generates a set of switching control signals 160. The switching control signals 160 drive the power stages 150, which regulates an output voltage (Vout, 155) and drives a load. A feedback from the output voltage (Vout, 155) to the control loop 145 keeps the output voltage regulated to a given voltage. The set of switching control signals 160 is configured to drive the load (for example a processor 405) connected to the output voltage (Vout, 155).

The multiphase power controller 105 has a threshold generation circuit 110 to generate a set of threshold signals 123, 124. The set of threshold signals 123 and 124 are generated in response to a set of control outputs and a reference as shown in FIG. 1. The set of control outputs are generated from a set of comparators 125. The set of threshold signals 123, 124 include an add signal and a drop signal. The threshold signals 123, 124 are generated using a set of summers (205, shown in FIG. 2 and later in this description). The threshold signals 123, 124 are fed to the set of comparators 125.

A summer 120 receives inductor currents (from the inductor 320 of each power stage 150) and converts the inductor currents to an equivalent voltage (VIsum), on line 122. In various embodiments, the power stage also has a filter (for example an LC filter) having the inductor 320 and a capacitor 325 coupled to a node between the transistors 310.

The equivalent voltage VIsum is fed to the set of comparators 125 along with the set of threshold signals 123 and 124. The equivalent voltage VIsum is compared with two different thresholds signals, the add signal (Vth_add) 123 and the drop signal (Vth_drop) 124. When the VIsum is greater than Vth_add, the comparator output triggers and provides a pulse as a control output (130) to add a phase. When the VISUM is lower than Vth_drop, the comparator output triggers and provides a pulse to a control output (130) to drop a phase. In one embodiment, the multiphase power controller 105 has only two comparators 125 irrespective of number of phases. In another embodiment, the thresholds for both the comparators 125 are independent. Therefore, the currents for adding a phase or dropping a phase are independently chosen.

The set of control outputs 130 includes a set of pulse width modulated (PWM) outputs. The control outputs 130 are connected to a state machine 135. The state machine 135 also receives a clock input 165. The clock input 165 is a system clock that synchronizes the operation of the multiphase power supply controller and several other circuits associated with the controller. The state machine 135 generates a set of phase control signals 140 in response to the control outputs 130. A control loop 145 receives the phase control signals. An output (switching control signal 160) of the control loop 145 is provided to the set of power stages 150.

Figure 2:
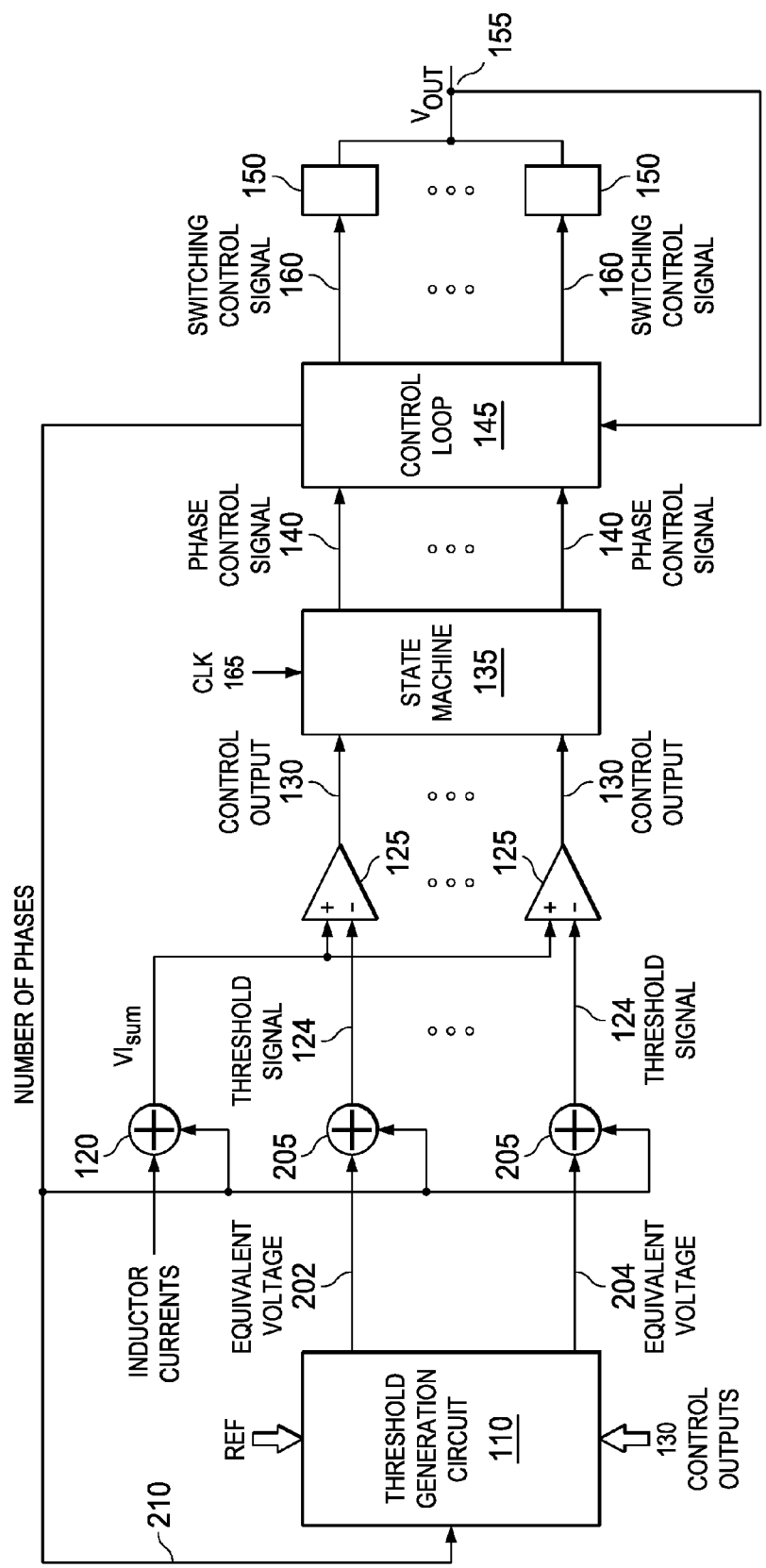
FIG. 2 depicts a threshold generation circuit according to an embodiment.

The control loop 145 is shown as a block in FIGS. 1 and 2, and block has associated circuitry to enable the operation of the loop receiving inputs and generating corresponding outputs. Similarly, the state machine 135 is shown as a block and has associated circuitry to perform the functions of a state machine. In one embodiment, threshold generation circuit 110, comparators 125, state machine 135 together is referred to as a phase manage block. The phase manage block generates the phase control signals 140 that are provided to the control loop 145.

Figure 3:
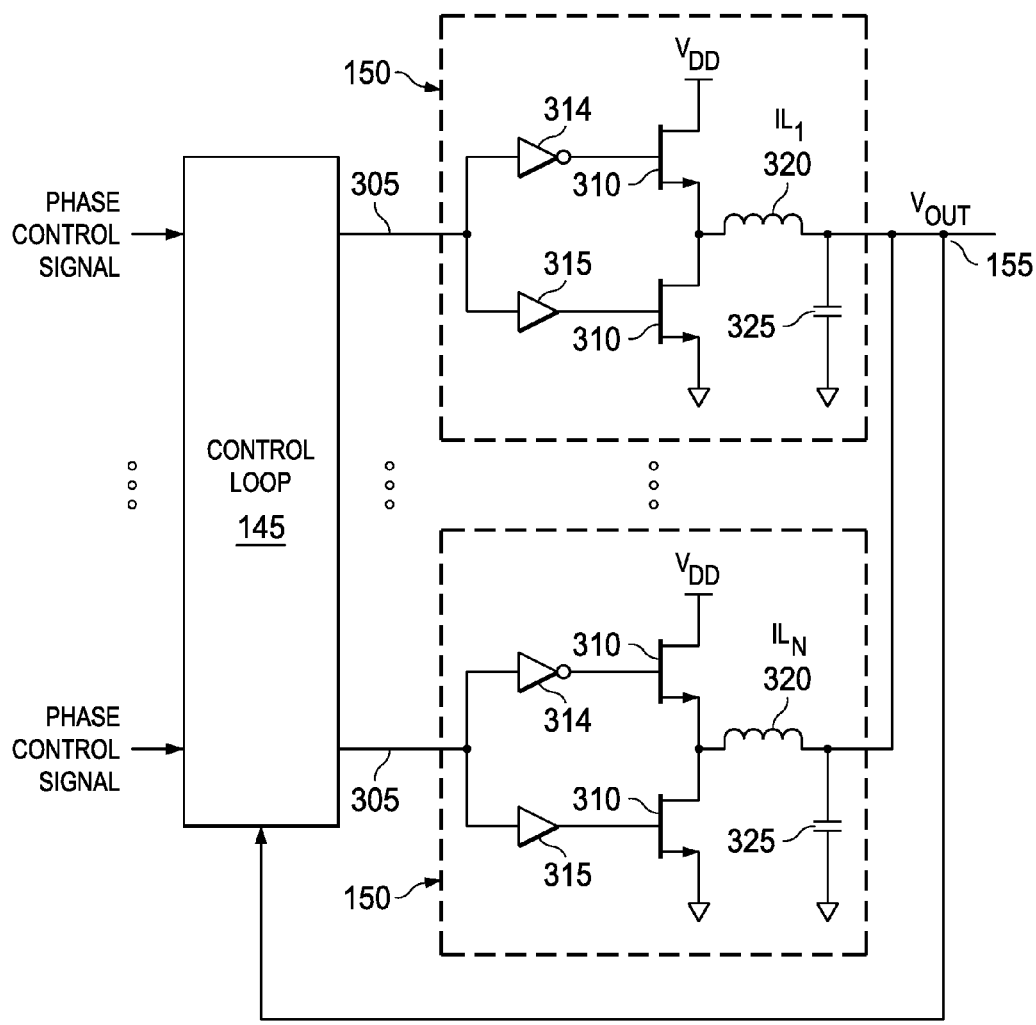
FIG. 3 depicts a power stage in the multiphase power system according to an embodiment.

Each of the set of power stages 150 has a driver, a plurality of transistors, the inductor and a capacitor coupled to each other (as illustrated in FIG. 3). The set of phase control signals 140 include a phase add signal and a phase drop signal. The state machine 135 monitors the control outputs 130 and adds or drops the phase using phase control signals 140 (phase_add and phase_drop signals). Depending on phase_add and phase_drop signal status, the number of phases is calculated in the state machine 135. The information about the number of phases is fed back to the summer 120 and the threshold generation circuit 110. The summer 120 decides on the number phase currents to be summed up. The state machine 135 has a counter that stores the active number of phases at a present state. For example, if the system is at $n^{th}$ phase and a phase_add signal is received, the counter counts 'n+1' and $n+1^{th}$ phase is activated.

Referring now to FIG. 2, a threshold generation circuit 110 is illustrated according to an embodiment. The threshold signals (123, 124) are generated using summers 205. In the threshold generation circuit 110, the equivalent voltages (on lines 202 and 204) proportional to the inductor currents are generated by a long resistor ladder (not shown in the Figures). Top and bottom ends of resistor ladder are regulated by a precision voltage. The source and sink currents are connected to both regulated ends to minimize the impact of impedance of the resistor ladder.

In one embodiment, three programmable analog multiplexers dynamically select the thresholds for selecting a) common mode current b) phase add offset current and c) phase drop offset current. The currents are then converted to the equivalent voltage with fixed offset (Vref). In one embodiment, current may also be controlled, in addition to or instead of the voltage, using techniques for current control instead of converting current to an equivalent voltage. The set of analog multiplexers (not shown in the Figures) in the system continuously sample the actual number of phases from the control loop 145. Based on the actual number of phases, the multiplexer output is selected for all the three analog multiplexers. The multiplexer outputs are fed to the summers 205. The summers 205 add the equivalent voltages (on lines 202 and 204), and generates the threshold signals based on the number of phases information from the control loop 145. Accordingly, the threshold generation circuit 110 is configured to change the threshold as per the number of phases.

Figure 5:
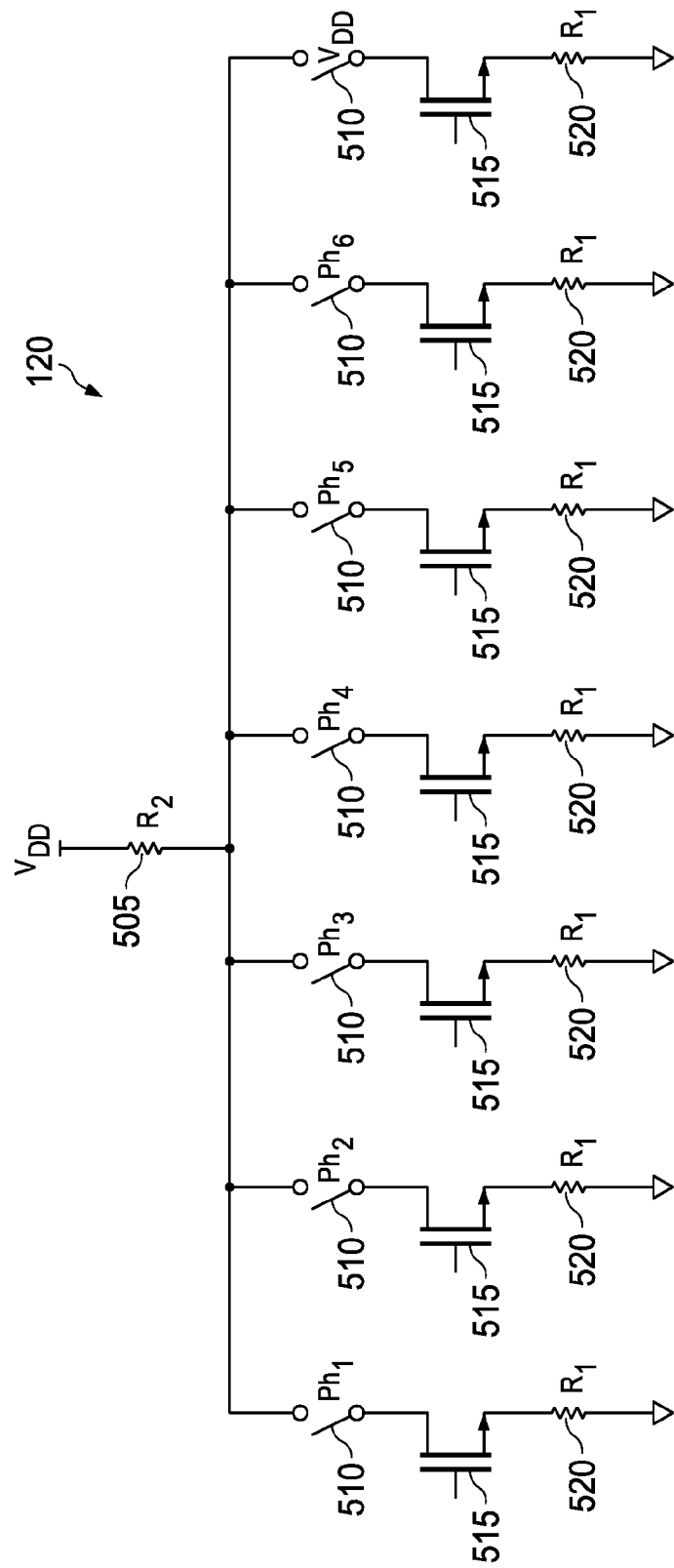
FIG. 5 depicts a summer in the multiphase power system.

The summer 120 is configured to add all inductor currents with offset (for phase_add and phase_drop signals). The summer uses total (N+1) summing currents, where N is maximum number of phases. Referring now to FIG. 5 a summer 120 is depicted. The summer 120 has 7 summing branches. Each summing portion has a switch 510 controlled by the output of the control loop 145 (number of phases). The maximum phases used is 6 in this example thereby needing are a total of 7 summing branches. The switch 510 is connected to a transistor 515. The transistor 515 is connected to a ground terminal through a resistor 520. The output voltage across resistor R2, 505 is the final summed output.

The current information is received at a gate of the transistor 515. Depending on the voltage, the current flows from resistor R2 505 to resistor R1 520. The current at the resistor R1 520 is directly proportional to the voltage at the gate of the transistor 515. Currents from each summer branch flows and adds to resistor R2 505. Output voltage Vout (of summer, 120) is proportional to (actual no. of phases)*R2/R1. Implementation of the summer 205 in FIG. 1 is similar to that of summer 120.

Referring back to FIG. 2, in one embodiment, the summers 120 and 205 are used to generate a final voltage for the threshold signals. This ensures that all the thresholds use the same network along with actual current so that any mismatches and PVT (process, voltage and temperature) variations are managed by optimizing devices and the circuit layout. In one embodiment, one summer (any of summer 120 or 205) is used three times instead of using two summers 205 and one summer 120. The current summers 120, 205 generate VIsum and threshold signals (Vth_add and Vth_drop signals). VIsum and threshold signals are fed to two comparators 125. The phase control signals 140 (phase_add or phase_drop signals) are generated based on the actual current, the add signal and the drop signal (threshold signals 123, 124). If VIsum is less than the threshold voltage, the phase_drop signal is generated and the number of phases is sequentially dropped by one phase. The phase control signals 140 indicate the optimum number of phases required for a particular load requirement. The phase drop operation may be defined as dropping (or removing) of a particular phase during DC operation. Phase drop in DC operation occurs when all the phase currents from the inductors are summed up and when VIsum is less than the threshold voltage. Note that a particular phase remains inactive until the state machine 135 generates the phase_add signal based upon actual current. Once an input is received from the state machine 135, that particular phase is added again. The state machine 135 operates continuously and adds or drops phases based on actual current and the output of the state machine 135 in a looped fashion.

During operation, the state machine 135 latches the control outputs 130 and generates phase control signals 140. The phase control signals 140 are provided to a control loop 145. The control loop 145 is configured to calculate and generate an updated number of phases. The updated number of phases is sent back to the threshold generation circuit 110 and summers 120 and 205 on line 210. A new set of threshold signals are generated thereafter and compared for meeting any criterion for adding or dropping the phases depending on the required efficiency of the multiphase power system. The control loop 145 continues the operation till a last phase of the number of phases is reached in a changing load condition.

In one aspect, the number of phase change in multiphase power controller re-distributes the current in each inductor. The change in load current is sensed and compared with new thresholds. When the load current crosses add or drop threshold limits, the process repeats and the controller 105 is configured to decide whether to add or drop the phases. Monitoring of load or phase current is designed to operate continuously and the controller 105 adaptively decides the optimum number of phases. The multiphase power system has a fast transient response to adapt to change in load currents.

FIG. 3 depicts a power stage 150 in the multiphase power system. Each power stage 150 receives a switching control signal 305 input from the control loop 145. Generally, the number of power stages 150 is equal to the number of switching control signals 305. In the instant example, there are 'n' phase control signals and 'n' power stages 150. Each power stage 150 has a plurality of transistors 310, a driver 315 connected to the gate of one transistor, a driver with an inverter 314 connected to the gate of the transistor 310, and a filter connected to the transistors. The filter has an inductor 320 and a capacitor 325. The inductor currents provided to the summer 120 are the currents flowing through the inductors 320 of each power stage 150. Each power stage 150 drives a load (for example, load 405) connected to the output voltage Vout node 155. The output voltage Vout is fed back to the control loop 145 to dynamically change the set of control outputs as explained earlier.

Figure 4:
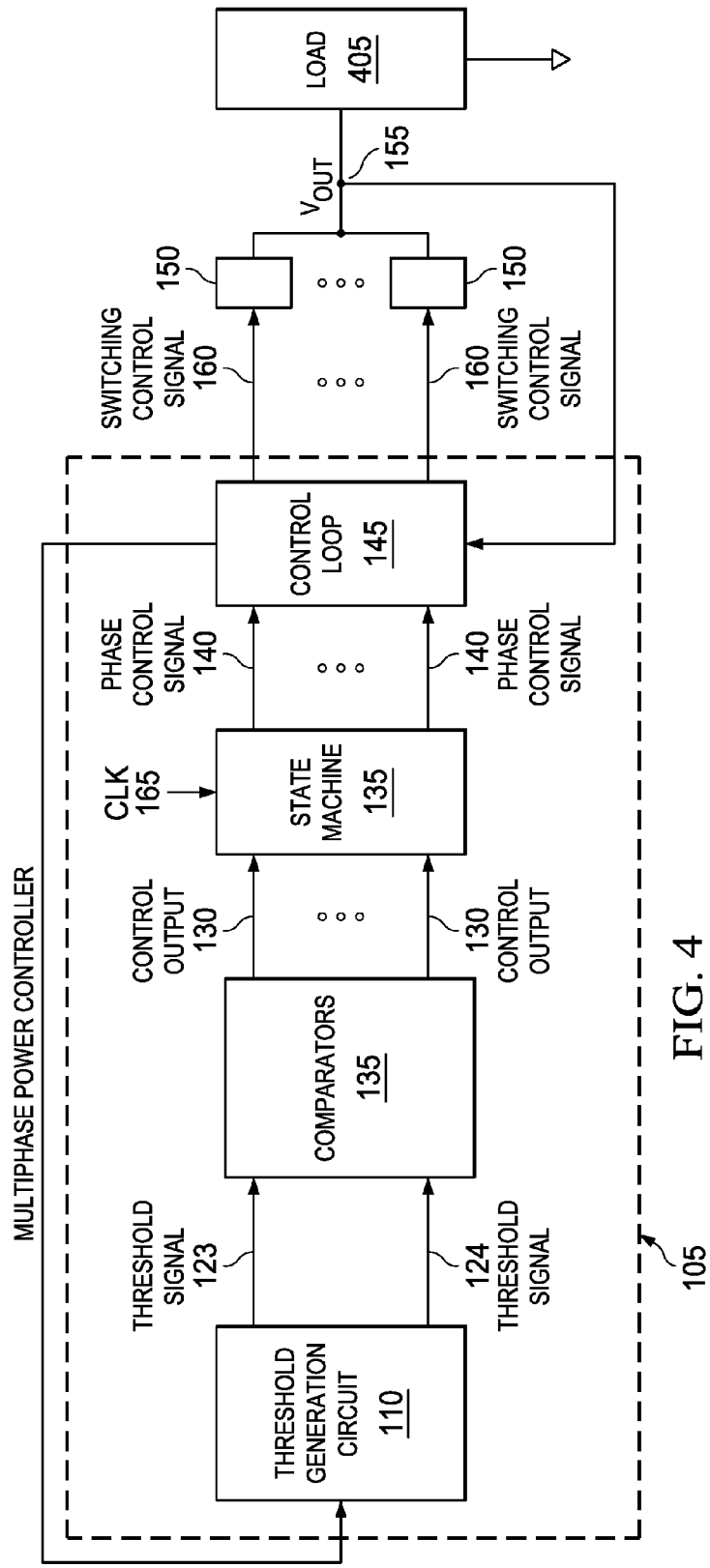
FIG. 4 depicts a multiphase power controller with a load according to an embodiment.

FIG. 4 depicts the multiphase power controller 105 with a load 405. The load 405, in one embodiment, is a processor configured to be driven by the power stages 150. The processor is a microprocessor in another embodiment. The output voltage 155 of the multiphase power controller 105 is connected to the processor 405. The load 405 draws current from the output voltage node (Vout, 155). The multiphase controller 150 of FIG. 4 is identical in connection and operation to the multiphase controller 105 of FIG. 1 and is not repeated here for the sake of simplicity.

Embodiments disclosed herein can include any type of computerized device (e.g., a controller, microprocessor, digital signal processor, etc.) or the like configured with software and/or circuitry (e.g., a processor) to process any or all of the method operations disclosed herein. In other words, embodiments herein can include a computerized device such as a computer or any type of processor that is programmed or configured to support operations such as those explained herein.

In one embodiment, the multiphase power controller 105 is formed on a semiconductor die by semiconductor manufacturing techniques that are well known in the art. The semiconductor die also includes other circuits fabricated thereon.

The foregoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. A multiphase power system comprising:
 a multiphase power controller that generates a set of switching control signals to drive a set of power stages, the set of power stages generating an output that drives a load, the multiphase power controller including:
  a summer to generate an equivalent voltage representative of a sum of inductor currents from each of an inductor in the set of power stages;
  a threshold generation circuit, coupled to the summer, to generate a set of threshold signals in response to a set of control outputs and a reference;
  a set of comparators to generate the set of control outputs, in response to the equivalent voltage and the set of threshold signals; and
  a state machine to generate a set of phase control signals in response to the set of control outputs, the set of control outputs changing a number of the set of switching control signals.

2. The multiphase power system of claim 1, in which each of the set of power stages includes a driver, an inverter, a plurality of transistors, the inductor and a capacitor coupled to each other.

3. The multiphase power system of claim 1, in which the set of control outputs includes a set of pulse width modulated (PWM) outputs.

4. The multiphase power system of claim 1, in which:
 the set of threshold signals include an add signal and a drop signal; and
 the set of phase control signals include a phase add signal and a phase drop signal.

5. The multiphase power system of claim 1, in which:
the threshold generation circuit generates the set of threshold signals from a resistor ladder; and
a top and a bottom end of the resistor ladder are regulated by a voltage.

6. A multiphase power controller comprising:
a phase manage block that generates a set of phase control signals in response to an equivalent voltage and a threshold voltage; and
a control loop that generates a set of switching control signals in response to the set of phase control signals, the set of switching control signals driving a set of power stages, the set of power stages generating an output that drives a load; in which the output is fed back to the control loop.

7. The multiphase power system of claim 6, in which the phase manage block includes:
a summer to generate an equivalent voltage representative of a sum of inductor currents from each of an inductor in the set of power stages;
a threshold generation circuit to generate a set of threshold signals in response to a set of control outputs and a reference;
a set of comparators to generate the set of control outputs, in response to the equivalent voltage and the set of threshold signals; and
a state machine to generate a set of phase control signals in response to the set of control outputs, the set of control outputs changing a number of the set of switching control signals.

8. The multiphase power system of claim 6, in which each of the set of power stages comprises a driver, an inverter, a plurality of transistors, the inductor and a capacitor coupled to each other.

9. The multiphase power system of claim 8, in which each of the set of power stages comprises a driver, a plurality of transistors, the inductor and a capacitor coupled with each other.

10. The multiphase power system of claim 6, in which:
the set of threshold signals include an add signal and a drop signal; and
the set of phase control signals include a phase add signal and a phase drop signal.

11. The multiphase power system of claim 6, in which the output is fed back to the control loop to dynamically change the number of the set of switching control signals.

12. An apparatus comprising:
a processor;
a multiphase power controller coupled to the processor, the multiphase power controller that generates a set of switching control signals to drive a set of power stages, the set of power stages generating an output that drives the processor, the multiphase power controller including:
a summer to generate an equivalent voltage representative of a sum of inductor currents from each of an inductor in the set of power stages;
a threshold generation circuit to generate a set of threshold signals in response to a set of control outputs and a reference;
a set of comparators to generate the set of control outputs, in response to the equivalent voltage and the set of threshold signals; and
a state machine to generate a set of phase control signals in response to the set of control outputs, the set of control outputs changing a number of the set of switching control signals.

13. The apparatus of claim 12, in which each of the set of power stages includes a driver, an inverter, a plurality of transistors, the inductor and a capacitor coupled to each other.

14. The apparatus of claim 12, in which the set of control outputs includes a set of pulse width modulated (PWM) outputs.

15. The apparatus of claim 12, in which:
the set of threshold signals include an add signal and a drop signal; and
the set of phase control signals include a phase add signal and a phase drop signal.

16. The apparatus of claim 12, in which the multiphase power controller is formed on a semiconductor die.

17. A multiphase power system comprising:
a multiphase power controller having an inductor current input lead and a switching control output lead, the switching control output lead coupled to a set of power stages, the multiphase power controller including:
a summer having a first input coupled to the inductor current input lead and an output coupled to a first input of a set of comparators;
a threshold generation circuit having an input and an output, the output connected to a second input of the set of comparators;
a state machine having an input connected to outputs of the set of comparators;
a control loop having a first input connected to a set of outputs of the state machine; the control loop having a set of first outputs connected to the switching control output lead; the control loop having a second output coupled to a second input of the summer and the input of the threshold generation circuit; the set of power stages having an output coupled to a voltage output terminal; a second input of the control loop coupled to the voltage output terminal; and
a load having an input connected to the voltage output terminal.

18. The multiphase power system of claim 17, in which the load is a microprocessor.

19. The multiphase power system of claim 17, in which the outputs of the set of comparators generate the set of control outputs, and in which the set of control outputs change a number of the set of switching control signals active at a given time.

* * * * *